United States Patent
Natu et al.

(10) Patent No.: US 10,810,141 B2
(45) Date of Patent: Oct. 20, 2020

(54) MEMORY CONTROL MANAGEMENT OF A PROCESSOR

(71) Applicant: Intel Corporation, Santa Clara, CA (US)

(72) Inventors: Mahesh S. Natu, Folsom, CA (US); Murugasamy K. Nachimuthu, Beaverton, OR (US); Bill Nale, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 15/720,659

(22) Filed: Sep. 29, 2017

(65) Prior Publication Data
US 2019/0102325 A1 Apr. 4, 2019

(51) Int. Cl.
| | |
|---|---|
| *G06F 12/14* | (2006.01) |
| *G06F 12/084* | (2016.01) |
| *G06F 9/50* | (2006.01) |
| *G06F 9/4401* | (2018.01) |

(52) U.S. Cl.
CPC ........ *G06F 12/1483* (2013.01); *G06F 12/084* (2013.01); *G06F 12/1416* (2013.01); *G06F 9/4401* (2013.01); *G06F 9/5016* (2013.01)

(58) Field of Classification Search
None
See application file for complete search history.

(56) References Cited

U.S. PATENT DOCUMENTS

| | | | | |
|---|---|---|---|---|
| 6,560,717 B1* | 5/2003 | Scott | ....................... | G06F 9/505 714/4.1 |
| 6,570,782 B1* | 5/2003 | Brandenberger | ...... | G11C 17/00 365/100 |
| 6,795,905 B1* | 9/2004 | Ellison | ................ | G06F 12/1491 711/121 |
| 8,862,930 B2* | 10/2014 | Horman | .............. | G06F 11/1415 711/150 |
| 8,904,093 B1* | 12/2014 | Nishimoto | .......... | G06F 12/0871 711/103 |
| 9,369,389 B1* | 6/2016 | Weiser | ................... | G06F 9/5011 |
| 2002/0069316 A1* | 6/2002 | Mattison | ................... | G06F 8/65 711/103 |
| 2005/0097345 A1* | 5/2005 | Kelley | .................... | G06F 9/468 726/6 |
| 2008/0024899 A1* | 1/2008 | Chu | ....................... | G06F 3/0614 360/69 |
| 2008/0168235 A1* | 7/2008 | Watson | ................... | G06F 9/485 711/135 |
| 2009/0248976 A1* | 10/2009 | Rotithor | ................ | G06F 9/5016 711/113 |
| 2011/0119407 A1* | 5/2011 | Shah | ...................... | G06F 3/0611 710/6 |
| 2014/0196049 A1* | 7/2014 | Bobroff | .............. | G06F 9/45558 718/104 |

(Continued)

*Primary Examiner* — William E. Baughman
(74) *Attorney, Agent, or Firm* — Jordan IP Law, LLC

(57) ABSTRACT

Systems, apparatuses and methods may provide for technology that conducts a comparison between an identified capability of a memory device and memory usage rules associated with a processor. The memory usage rules are to identify allowed memory accesses by the processor. The technology further limits access by the processor to the memory device based upon the comparison.

28 Claims, 10 Drawing Sheets

(56) References Cited

U.S. PATENT DOCUMENTS

| | | | |
|---|---|---|---|
| 2014/0237475 A1* | 8/2014 | Jong | G06F 9/485 |
| | | | 718/102 |
| 2015/0095565 A1* | 4/2015 | Morris | G06F 3/0632 |
| | | | 711/109 |
| 2015/0256476 A1* | 9/2015 | Kurtzman | G06F 16/24578 |
| | | | 709/226 |
| 2016/0179643 A1* | 6/2016 | Sun | G06F 11/14 |
| | | | 714/6.23 |

* cited by examiner

MEMORY CONTROL MANAGEMENT OF A PROCESSOR

TECHNICAL FIELD

Embodiments generally relate to processors and memory control.

BACKGROUND

Storage systems may use non-volatile memory (NVM) media such as NAND or three-dimensional (3D) crosspoint (e.g., 3D XPoint™) technology for solid state drives (SSDs) to store data in volumes. Moreover, 3D crosspoint memory may operate in different modes (e.g., volatile, non-volatile, Peripheral Component Interconnect Express/PCI-e reads/writes allowed) and may be used in place of either volatile or non-volatile memory in a computer system when used in conjunction with an appropriate chipset and processor.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
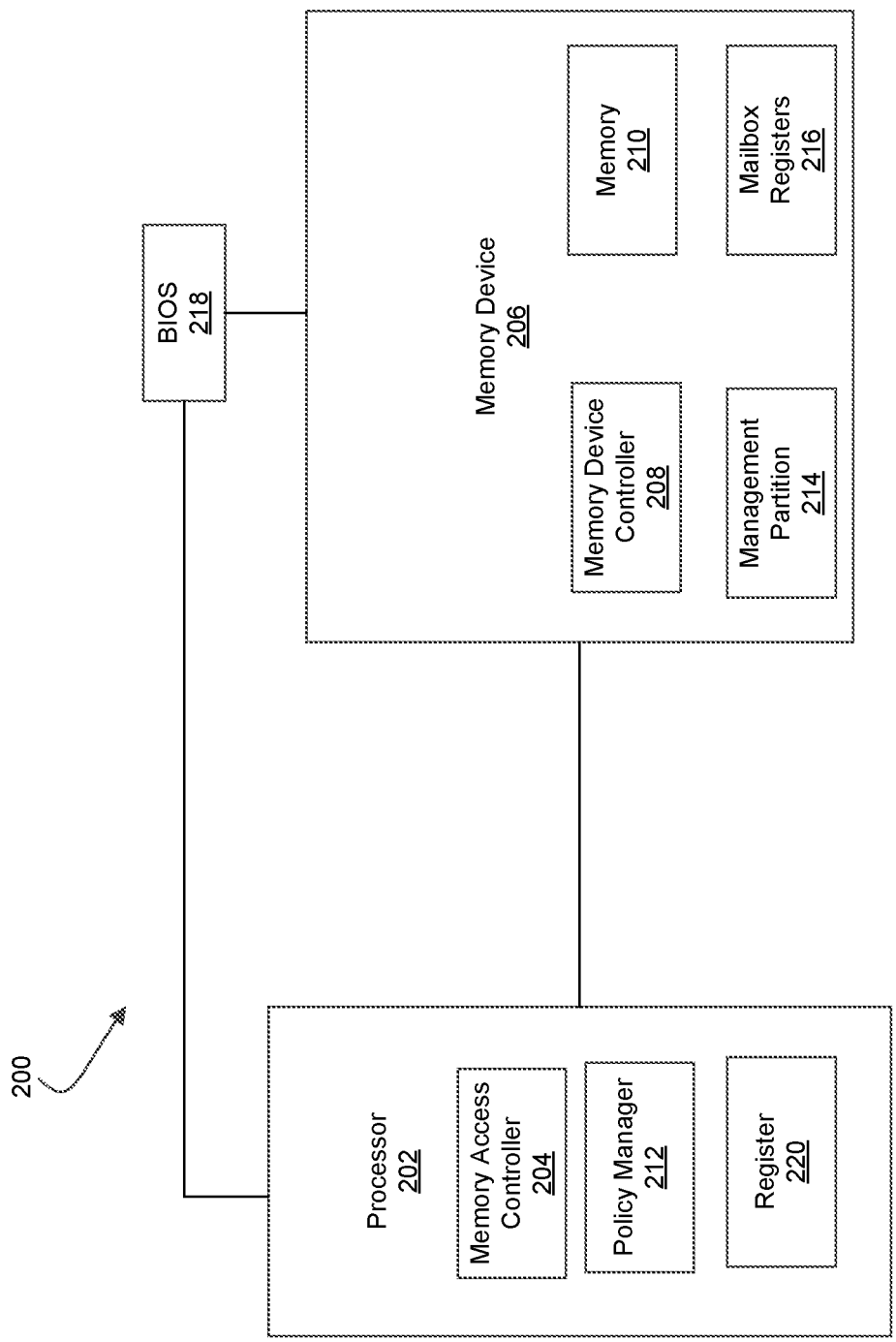
FIG. 1 is an illustration of an example of a computing architecture according an embodiment of the disclosure.

In some embodiments as illustrated in FIG. 1, during operation of a computing architecture 200, a processor 202 may access memory 210 in different ways depending upon a type of data to be accessed and an application which may use the data. For example, the processor 202 may read/write to volatile portion of memory 210 and/or non-volatile portion of memory 210. Such data accesses may facilitate execution of various operations by the processor 202. If, however the processor 202 is modified by, for example, a malicious program (e.g., a virus) or a user, the processor 202 may attempt to access a memory device 206 in an unsupported (e.g., unauthorized and/or illegal) manner. Such an illegal combination may detrimentally affect the computing architecture 200 by impairing system performance (e.g., slower performance), facilitating execution of the malicious program and/or resulting in a failed boot state. For example, if the processor 202 is unable to consistently access volatile memory portion of the memory 210 and then attempts to access the volatile memory portion, an error state may develop.

Embodiments of the present application may allow the processor 202 and the memory device 206 to limit the functions and/or the memory devices, including memory device 206, that are usable by the processor 202. For example, through the processor 202 hardware or firmware, such as portable code machine or microcode, the processor 202 may securely ascertain the capabilities of the memory device 206. The processor 202 may cross-check the capabilities against a policy (e.g., predefined rules) of policy manager 212, and limit the accesses by the processor 202 to the memory device 206 to prevent disallowed configurations of the processor 202 and the memory device 206. This may enhance the computing architecture 200 by preventing execution of malicious programs, reducing failed boot states and reducing impaired system performance states. The policy manager 212 may include a data structure (e.g., an array such as a lookup table) storing the rules, and further utilize a stock keeping unit of the processor 202 to ascertain which rules are applicable to the processor 202. As such, the data structure may include a number of different groups of rules, with each group corresponding to different stock keeping unit(s).

In some embodiments, the maximum available capacity of the memory device 206 may be tied to a processor configuration which may be determined from an identification of the processor 202, such as through a stock keeping unit. For example, lower end processors may only be allowed to utilize 1.5 TB of memory 210 capacity whereas higher end processors may be allowed to utilize the total capacity (e.g., 2 TB) of memory 210. Furthermore, if the memory 210 includes both volatile or non-volatile memory, a limitation may be enacted on lower end processors to only utilize one of the non-volatile memory and volatile memory of the memory 210 by only allowing a volatile or non-volatile memory mode be available. Furthermore, the processor 202 may determine whether Remote Direct Memory Access (RDMA) is allowed by the processor 202, and prohibit as much if RDMA access is not allowed.

In response to a specific event occurring, the memory device controller 208 may block the processor 202 from accessing the memory 210. For example, the memory device controller 208 may block access to the memory 210 upon any type of reset, sleep, reboot, or power off event, but allow access to management partition 214 and mailbox registers 216. The memory management partition 214 and mailbox registers 216 may be unblocked to allow proper configuration of the processor 202 and memory device 206 by verifying if the processor 202 has properly acknowledged memory device 206, and to also provide the identifying information of the memory device 206 to the processor 202. The memory device 206 may be a dual in-line memory module and the memory 210 may be a cache memory.

Once the access is blocked, the memory device controller 208 may only unblock the processor 202 and allow access to the memory 210 after the processor 202 has acknowledged that the memory device 206 was discovered by the processor 202 (e.g., if the data packet is received). By doing so, unauthorized processors may be prevented from accessing the memory device 206. Furthermore, by the above, the memory device controller 208 may ensure that the processor 202 is operating correctly and identifying the memory device 206. Otherwise, the memory device controller 208 may continue to lock out the processor 202 from the memory 210, and may attempt to provoke the processor 202 into identifying the memory device 206 for example by sending a data packet containing relevant information of the memory device 206 to the processor 202. The processor 202 and memory device 206 may be connected via a double data rate bus.

In some embodiments, during a wake event and/or a power-up event of the computing architecture 200, a basic input/output system (BIOS) 218 may command the memory device 206 to provide the data packet to the processor 202. The data packet may be signed (e.g., with a key) by the memory device 206 and therefore may not be tampered with by applications or other devices. The memory device controller 208 may store relevant information of the memory device 206, and transmit the relevant information in the data packet. For example, the data packet may include relevant information identifying capabilities of the memory device 206, for example, a size of the memory 210, supported memory modes (e.g., volatile memory, non-volatile memory, word addressable, byte addressable, bit addressable, directly application accessible via RDMA) of the memory 210 and/or a size of volatile and/or non-volatile regions of the memory 210. Once the processor 202 receives the data packet from the memory device 206, the processor 202 may log the contents (e.g., capabilities) of the data packet. For example, the processor 202 may log the contents into hardware register 220. The hardware register 220 may be set to read only by software to avoid tampering. That is, the hardware register 220 may only be written into by hardware, but may be read out of by software. The registers 220 may be reset upon an event, such as reboot, sleep or power down of the computing architecture 200.

The memory access controller 204 may reference the logged contents of the register 220 to discover the memory device 206 capabilities. The memory access controller 204 may further communicate with the policy manager 212 to determine the policies of the processor 202 with respect to memory accesses. The memory access controller 204 may then compare the policies against the capabilities of the memory device 206 to determine whether restrictions should be placed upon the accesses by the processor 202 to the memory device 206. For example, if a policy of the policy manager 212 indicates that the processor 202 may only utilize non-volatile memory, then any accesses to the supported memory mode of the volatile portion of the memory 210 may be restricted or forbidden. As such, even though the memory device 206 may be capable of operating in a plurality of different memory modes (e.g., byte addressable volatile and non-volatile memory), but if the processor 202 is restricted from utilizing all of the memory modes, the processor may be limited to only access less than all (e.g., one) of the memory modes (e.g., only read/write to byte addressable non-volatile memory and not the volatile memory). Thus, the processor 202 may be unable to read/write to volatile memory portion of the memory 210, and could only read/write to non-volatile memory portion of the memory 210. In contrast, if memory access controller 204 determines that the policies of the policy manager 212 do not restrict accesses to the memory device 206 then no limitations may be required. For example, if the processor 202 is able to legally access all of memory 210 in all supported modes of the memory device 206, then no limitations are needed.

In some embodiments, rather than the BIOS 218 commanding the memory device 206, the memory access controller 204 may issue a command to the memory device controller 208. In response, the memory device controller 208 may provide the data packet, which includes the information identifying capabilities of the memory device 206, to the processor 202. The memory access controller 204 may utilize the data packet similarly to as described above to determine whether restrictions should be placed upon the accesses by the processor 202 to the memory device 206.

In some embodiments, the memory access controller 204 may read the contents of the memory device 206 to determine the capabilities of the memory device 206. For example, a serial presence detect (SPD) may be utilized to read the contents of the management partition 214. The contents may include the information identifying capabilities of the memory device 206. The memory access controller 204 may utilize the contents similarly to as described above with respect to the data packet, to determine whether restrictions should be placed upon the accesses by the processor 202 to the memory device 206. In some embodiments, a System Management Bus (SMBUS) transaction may be provided by the processor 202 to the memory device 206 to processes the SPD.

Regardless of how the capabilities of the illustrated memory device 206 are determined, the memory access controller 204 may provide an acknowledgement or other communication to the memory device 206 upon the determination of the capabilities by the memory access controller 204. The memory device 206 may log the acknowledgement, and then unlock the memory 210. By waiting for the acknowledgement before unlocking the memory 210, the memory device 206 may verify that the processor 202 has indeed determined the capabilities of the memory device 206. Mailbox registers 216 may further be programmed to indicate that the memory 210 is unlocked. The mailbox registers 216 may be accessed by the processor 202 and/or BIOS 218 to determine whether the memory 210 is unlocked, and whether the processor 202 and memory device 206 are operable together.

In some embodiments, the mailbox registers 216 may be omitted, for example if the processor 202 directly reads the contents of the management partition 214 to determine the capabilities, or transmits the command to the memory device 206. In some embodiments, if the mailbox registers 216 are not programmed to indicate a successful unlock has occurred, the processor 202 or BIOS 218 may transmit another command to the memory device 206, or the processor 202 may attempt to directly read the management partition 214.

In some embodiments, different combinations of identifying the capabilities as described above may be utilized until successful identification occurs. For example, if the data packet is not transmitted after the command has been provided by the processor 202 or BIOS 218, the memory access controller 204 may attempt to read the management partition 214 to determine the capabilities. As another example, if the memory access controller 204 unsuccessfully attempts to read the management partition 214, a command may be provided by the processor 202 or BIOS 218 to the memory device 206 to provoke the memory device 206 to provide the data packet including the capabilities. In some embodiments, if the data packet is not sent after the BIOS 218 provides the command, the processor 202 may provide the command to provoke the memory device 206 to provide the data packet, and vice-versa.

The memory 210 may be 3D crosspoint memory, or another type of memory. For example, the memory 210 may implement a bit addressable storage by a change of bulk resistance, in conjunction with a stackable cross-gridded data access array. 3D crosspoint memory is a transistor-less, crosspoint technology, and is a 3-dimensional stackable media technology, allowing memory layers to be stacked on top of each other in a 3D manner. Furthermore, it is possible to utilize a section of 3D crosspoint memory as volatile memory, while using another section of the 3D crosspoint memory as non-volatile memory. For example, 3D crosspoint may be used in place of either volatile or non-volatile memory in a computer system.

Non-volatile memory is a storage medium that does not require power to maintain the state of data stored by the medium. A memory device may also include future generation non-volatile devices, such as a 3D crosspoint memory device, as already noted, or other byte addressable write-in-place nonvolatile and/or volatile memory devices. In one embodiment, the memory device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory device with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org). 3D crosspoint memory may be used in place of either volatile and/or non-volatile memory in a computing system.

Figure 2:
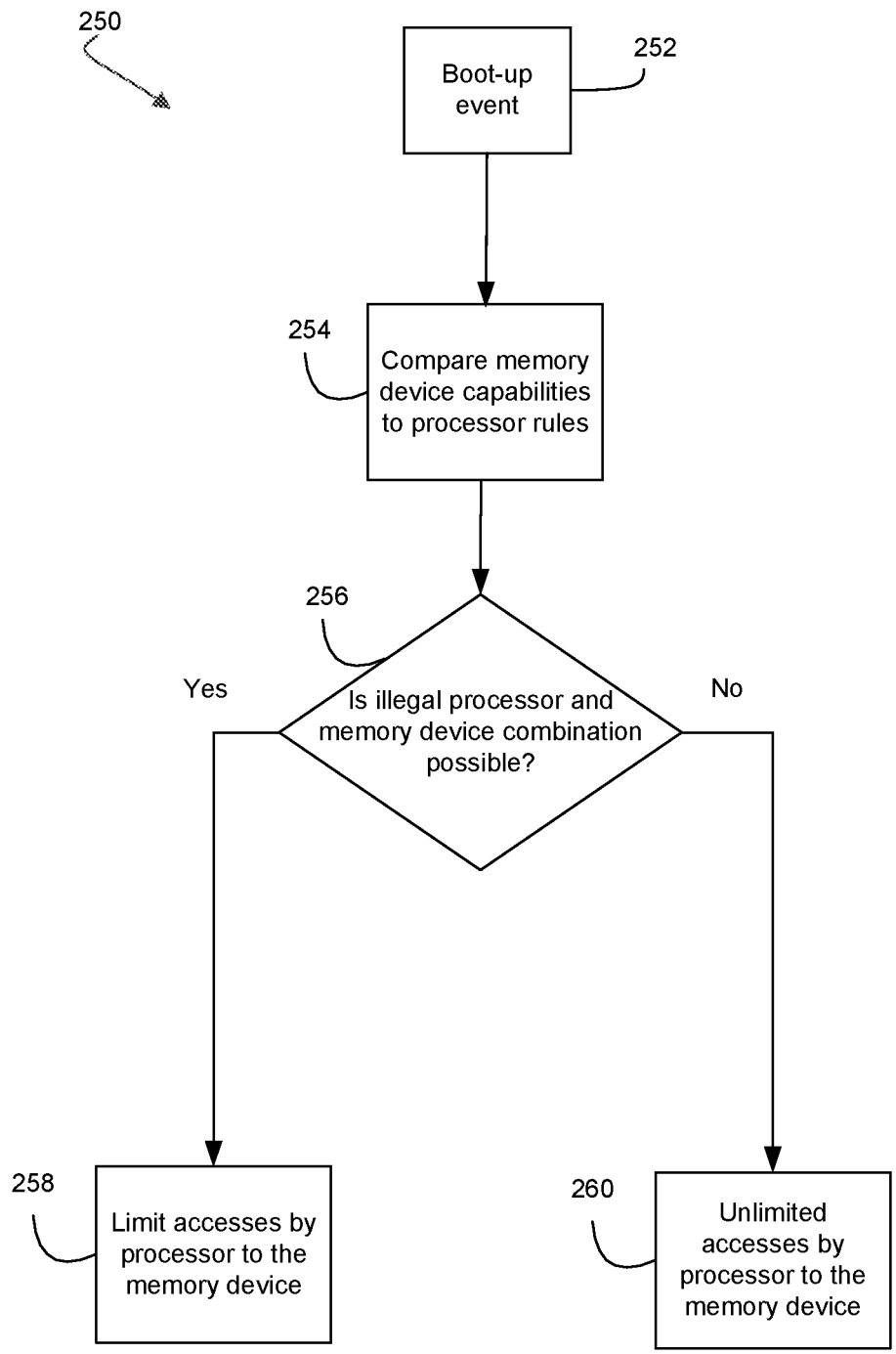
FIG. 2 is a flowchart of an example of a method of memory access control according to an embodiment of the disclosure.

FIG. 2 shows a method 250 of memory access control. The method 250 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor-logic (TTL) technology, or any combination thereof.

For example, computer program code to carry out operations shown in the method 250 may be written in any combination of one or more programming languages, including an object oriented programming language such as register transfer language) RTL, JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 252 initiates a boot-up event (e.g., power up of computing system or awakening). Illustrated processing block 254 may compare memory device capabilities to policies (e.g., rules) of a processor. The capabilities may be directly read by the processor from the memory device, or the processor may receive a data packet with the capabilities. The policies may indicate allowed and/or disallowed memory accesses by the processor. Illustrated processing block 256 may determine whether an illegal processor and memory device combination is possible. For example, if a memory access by the processor to the memory device may result in failed memory states, impaired system performance or indicate that a malicious program is attempting to authorize the memory, an illegal combination is possible.

If an illegal combination is possible, illustrated processing block 258 may limit access by the processor to the memory device. For example, a type of access (e.g., volatile or non-volatile reads/writes) may be forbidden and never executed by the processor, or only a certain amount of the memory may be accessed by the processor. If no illegal combination is possible, illustrated processing block 260 allows unlimited accesses by the processor to the memory device.

Figure 3:
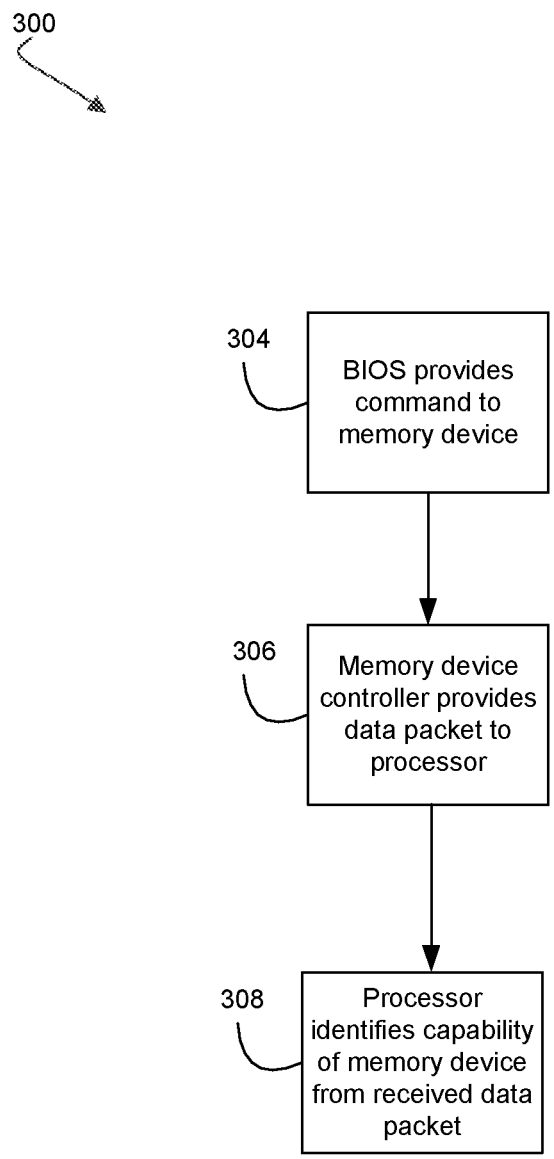
FIGS. 3-5 are flowcharts of examples of methods of identifying capabilities of a memory device according to embodiments of the disclosure.

FIG. 3 shows a method 300 of identifying capabilities of a memory device. The method 300 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

In illustrated processing block 304 a BIOS of a computing architecture may command the memory device to provide a data packet to the processor. The data packet may include capabilities of the memory device as described above. The computing architecture may include both the memory device and a processor. In illustrated processing block 306, the memory device may provide the data packet to the processor. In illustrated processing block 308, the processor identifies capabilities of the memory device from the received data packet. While not illustrated in FIG. 3, the processor may use the capabilities to determine whether to limit accesses to the memory device by the processor.

Figure 4:
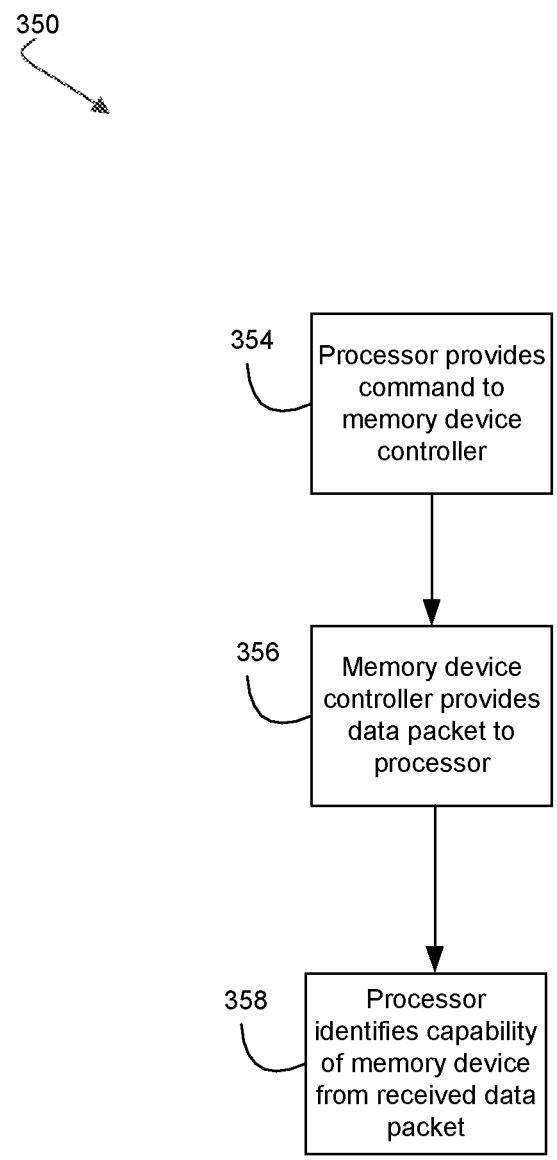

FIG. 4 shows a method 350 of identifying capabilities of a memory device. The method 350 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

In illustrated processing block 354 a processor of a computing architecture may command the memory device to provide a data packet to the processor. The data packet may include capabilities of the memory device as described above. In illustrated processing block 356, the memory device may provide the data packet to the processor. The computing architecture may include both the memory device and the processor. In illustrated processing block 358, the processor identifies capabilities of the memory device from the received data packet. While not illustrated in FIG. 4, the processor may use the capabilities to determine whether to limit accesses to the memory device by the processor.

Figure 5:
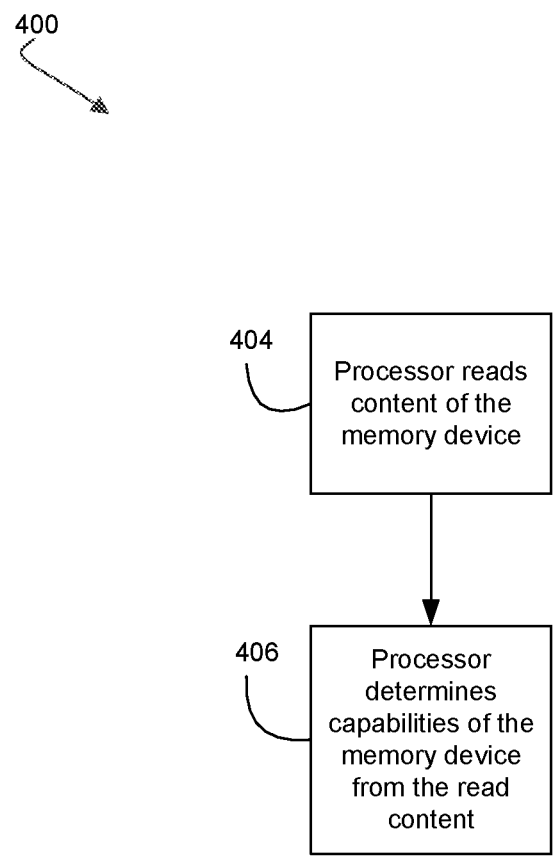

FIG. 5 shows a method 400 of identifying capabilities of a memory device. The method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

In illustrated processing block 404 a processor of a computing architecture may read the contents of the memory device. The contents may include capabilities of the memory device as described above. The contents may be read for example by an SPD process. In illustrated processing block 406, the processor identifies capabilities of the memory device from the contents. While not illustrated in FIG. 5, the processor may use the capabilities to determine whether to limit accesses to the memory device by the processor.

Figure 6:
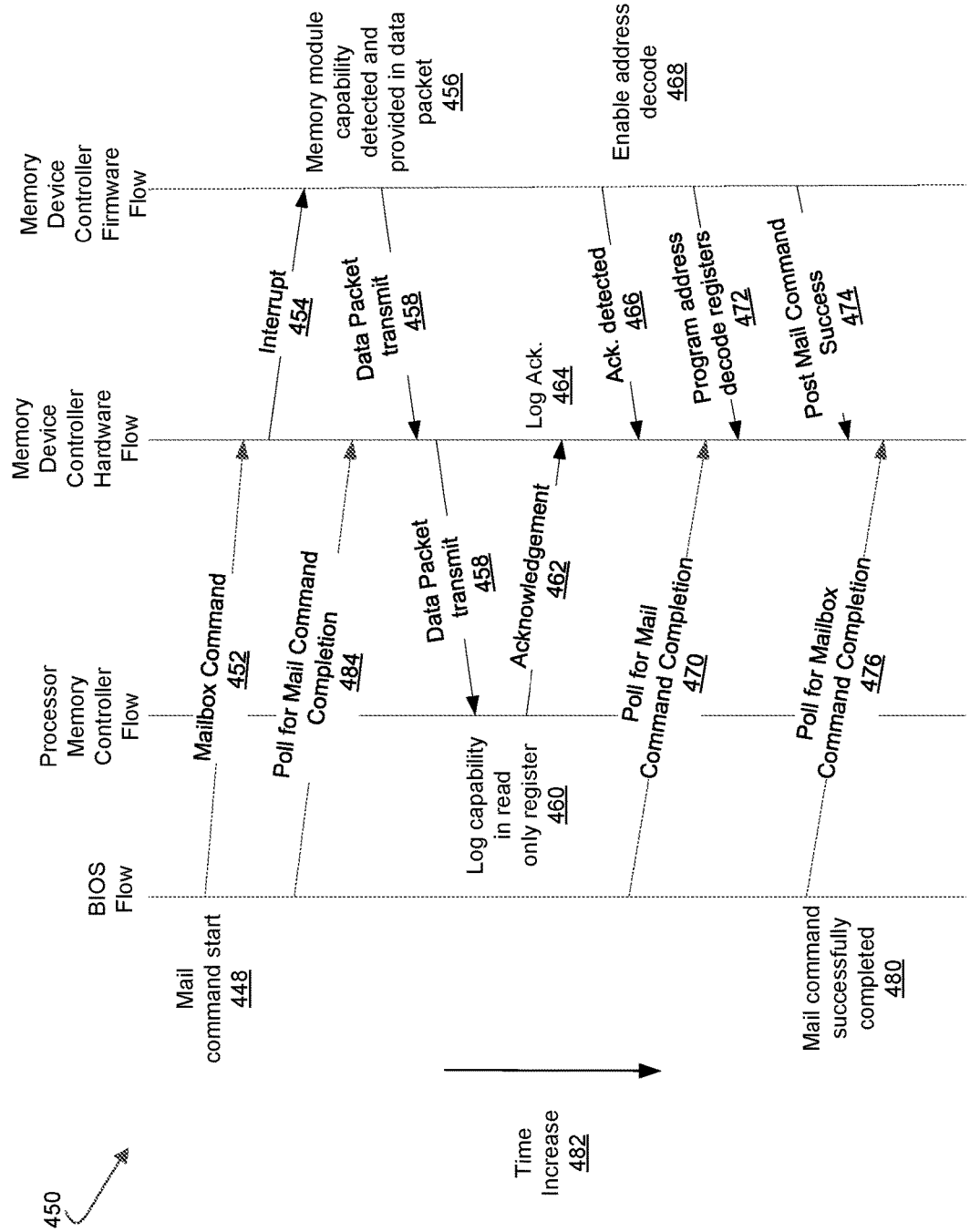
FIG. 6 illustrates a signaling diagram of an example of a method of memory control management according to an embodiment of the disclosure.

FIG. 6 illustrates a signaling diagram 450 to conduct memory control management. In the signaling diagram 450, time increases along arrow 482. During, for example, a memory subsystem initialization sequence, the BIOS may start a mail command 448, which may issue a mailbox command 452 to every memory device. While in the present example, only one memory device is described, it will be understood that more memory devices could be included. This mailbox command may be based on a standard mailbox command protocol implemented by the memory device.

The illustrated memory device controller hardware receives the mailbox command 452, and sends an interrupt 454 to the memory device controller firmware to notify the memory device firmware of the received mailbox command. The memory device controller firmware may detect memory device capabilities 456, and construct a data packet containing the capabilities. The memory device controller firmware may transmit the data packet 458 to the memory device controller hardware, and the data packet may be signed and verified by the hardware. The data packet may in turn be transmitted to the processor, and specifically to the processor memory controller. The data packet may be a double data rate packet. The capabilities included in the data packet may include a size of a memory of the memory device, supported memory modes of the memory device, a size of each of a volatile region and/or a non-volatile region of the memory device.

The processor memory controller may decode the data packet and log the capability 460 in a register. The capability may be expressed in bytes, and the register may be an uncore register. There may be one register per memory device with reset defaults value of 0. The register may be read only from a software perspective. As described above, the processor memory controller may cross-check capabilities against a policy (e.g., predefined rules), and prevent disallowed configurations of the processor and memory device by limiting access by the processor. An acknowledgement 462 of the data packet is transmitted by the processor memory controller to the memory device controller hardware.

The acknowledgement is received by the memory controller hardware, and logged into a register 464. The register may be firmware visible by the memory device controller firmware.

When the memory device controller firmware detects the acknowledgment 466 in the register, the memory device controller firmware enables address decode 468. The memory device controller firmware may then program the address decode registers 472 of the memory device controller hardware so that the full capacity of the memory device (e.g., memory) is now accessible to the host and in particular, the processor. Until the decode registers are programmed, the memory is locked. This interlock may ensure that the capabilities are logged by the processor before the host or computing architecture has access to the memory device capacity.

The memory device controller firmware further posts that the mail command was successful 474 to the memory device controller hardware, and may store as much in a mailbox register to be read by BIOS. The BIOS has been polling for mail command completion 484, 470, 476, and may determine that the mail command was successful 480. Software and the processor may now access the memory device.

While not illustrated, if the process is completed unsuccessfully (e.g., after a certain number of polls by the BIOS, the mail command is still not successful) the BIOS may re-initiate the mail command at 448 and the process starts over. After a certain number of times of restarting the process, a warning error may be generated to the user indicating a malfunction has occurred, and/or an error may be reported to the BIOS by the memory device controller hardware and firmware.

As described above, when the memory device detects a platform reset or sleep state transition, the memory device turns off access to media (e.g., memory). As described in FIG. 6, the memory device may continue to allow access to management partition(s) of the memory device and mailbox register(s). This is so that the BIOS may properly configure the memory device and generate a warning error if needed.

As described above, in some embodiments, there may be several memory devices each attached to a different socket (e.g., memory slot). The processor may need to limit a per socket total memory capacity for a given processor stock keeping unit (SKU). This may include executing the following. For each memory device, a memory device user capacity is sent as part of the memory device data packet. Each data packet is stored in a respective log register. A total capacity of the memory devices is determined by reading the memory device log registers and adding the memory device user capacities. If the total capacity exceeds the allowed capacity, the processor memory controller may take punitive action, such as disabling channels or stopping the system boot or severely throttling the performance.

While various operations are undertaken above the memory device controller hardware and firmware, it is understood that the operations may be reallocated to be executed by either of the hardware or the firmware.

Figure 7:
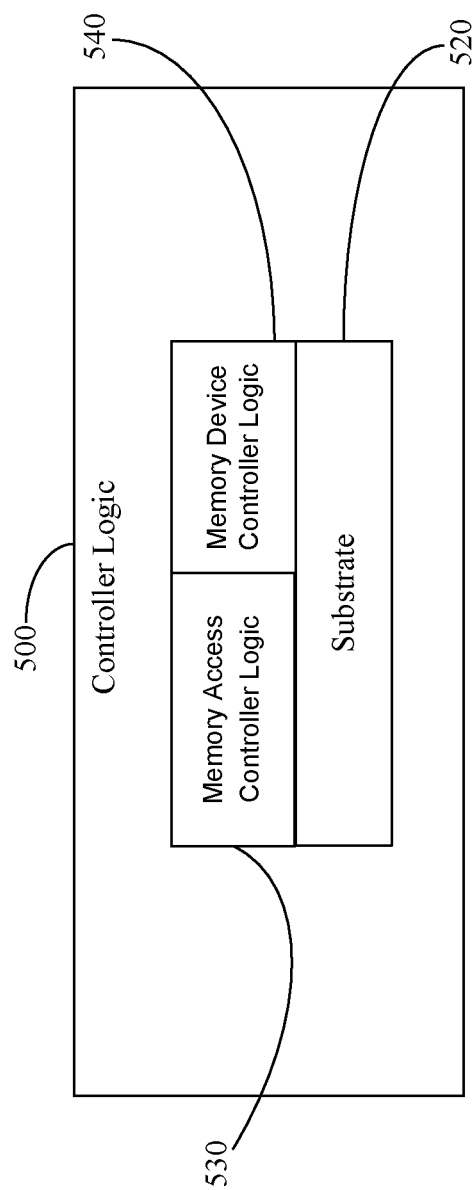
FIG. 7 illustrates an example of memory access controller logic and memory device controller logic according to an embodiment of the disclosure.

FIG. 7 illustrates controller logic 500 (e.g., processor, semiconductor packaged apparatus, chip, die). The controller logic 500 may implement one or more aspects of the methods 250, 300, 350 and/or 400 (FIGS. 2-5) and/or the signaling diagram 450 (FIG. 6), and may be readily substituted for the memory access controller 204 and memory device controller 208 (FIG. 1), already discussed. The illustrated controller logic 500 includes a substrate 520 (e.g., silicon, sapphire, gallium arsenide) and memory access controller logic 530 (e.g., transistor array and other integrated circuit/IC components) and memory device controller logic 540 (e.g., transistor array and other integrated circuit/IC components) coupled to the substrate 520. The memory access controller logic 530 and memory device controller logic 540 may be implemented at least partly in configurable logic or fixed-functionality logic hardware. Moreover, the memory access controller logic 530 and memory device controller logic 540 may control a type of access by a processor to a memory device.

Figure 8:
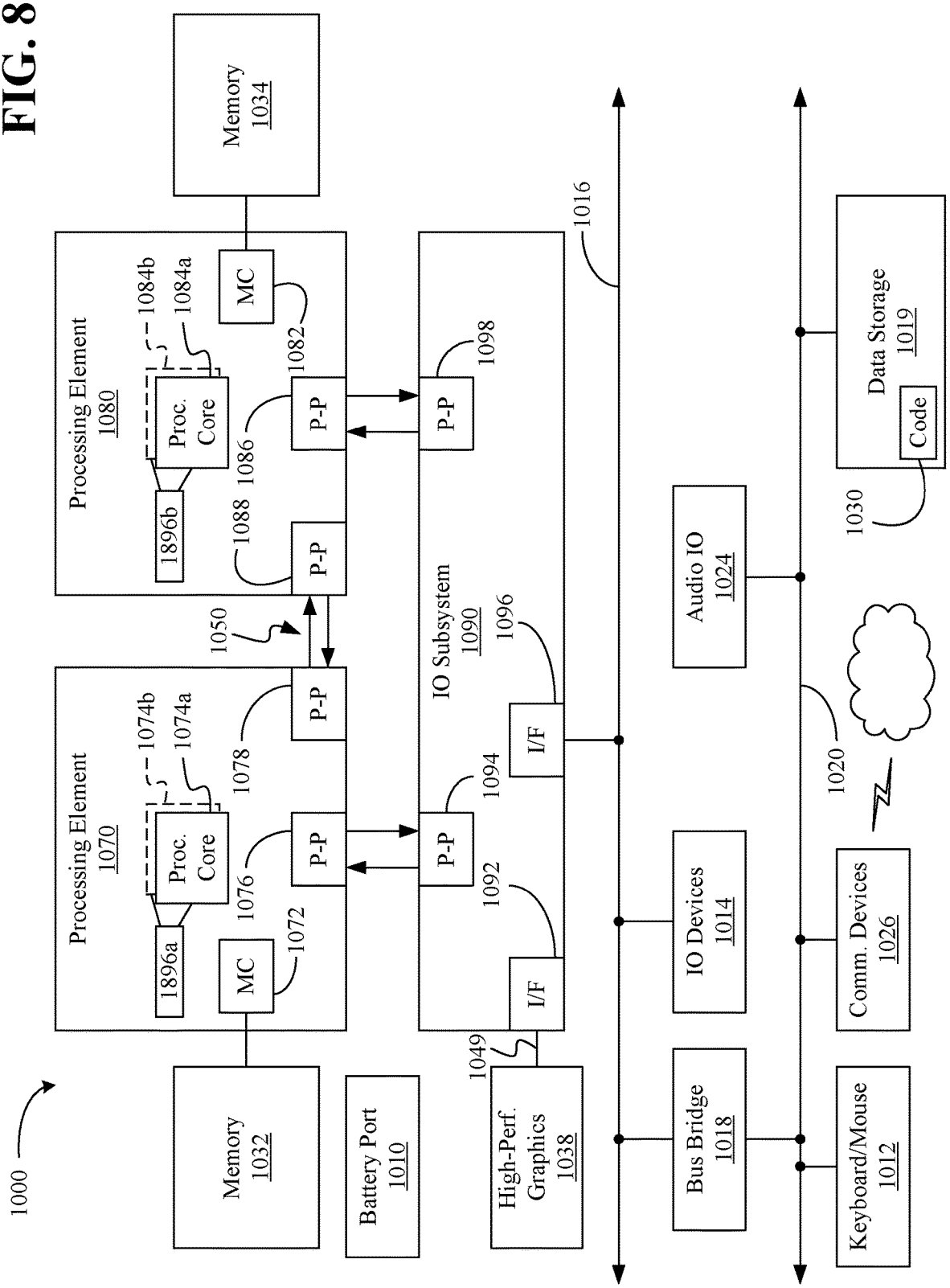
FIG. 8 illustrates a block diagram of an example of a performance-enhanced computing system according to an embodiment of the disclosure.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with one or more aspects of the methods 250, 300, 350, 400 and/or signaling diagram 450 (FIGS. 2-6) and may be readily substituted for the memory access controller 204, already discussed.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCIe bus or another third generation I/O interconnect bus, although the scope of the embodiments are not so limited.

As shown in FIG. 8 various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment or be a custom hardware implementation such as an ASIC or FPGA in another embodiment. The illustrated code 1030, may implement one or more aspects of the methods 250, 300, 350, 400 and/or signaling diagram 450 (FIGS. 2-6) and may be readily substituted for the memory access controller 204 and memory device controller 208 (FIG. 1), already discussed may further be implemented by one or more of the processing elements 1070 and 1080. Further, an audio I/O 1024 may be coupled to second bus 1020 and a battery port 1010 may supply power to the computing system 1000.

Figure 9:
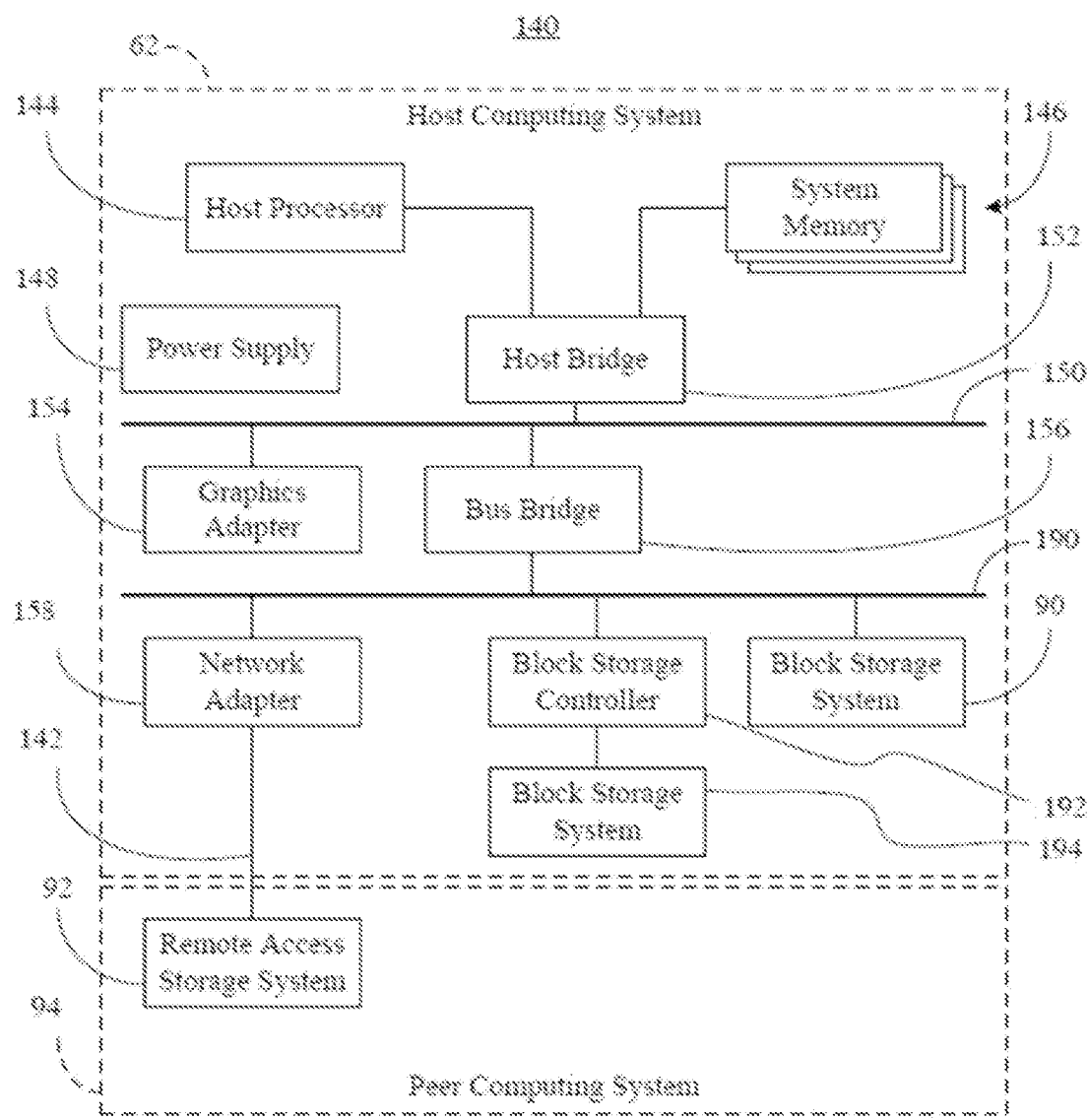
FIG. 9 is a block diagram of an example of a memory architecture according to an embodiment of the disclosure.

FIG. 9 shows a memory architecture 140. The memory architecture 140 may include a host computing system 62 that is coupled to a peer computing system 94 (e.g., in a message passing interface/MPI application, big data analytics application, etc.) via a fabric connection 142 such as, for example, an RDMA protocol (e.g., INFINIBAND, IWARP and/or ROCE). The computing systems 62, 94 may generally be part of electronic devices/platforms having computing functionality (e.g., datacenter, server, personal digital assistant/PDA, notebook computer, tablet computer), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof.

In the illustrated example, the host computing system 62 includes a host processor 144 (e.g., central processing unit/CPU) and system memory 146 (e.g., DRAM) coupled to a system bus 150 via a host bridge 152 (e.g., PCIe host bridge). The host processor 144 may execute an operating system (OS) and/or kernel. The host computing system 62 may also include a power supply 148 to provide power to the memory architecture 140 and/or the host computing system 62. The system bus 150 may also be coupled to a graphics adapter 154 and a bus bridge 156 (e.g., PCIe bus bridge). The illustrated bus bridge 156 is also coupled to an input/output (IO) bus 190 such as, for example, a PCIe bus. The IO bus 190 may be considered a subsystem interface as described herein. A block storage system 194 may be indirectly coupled to the IO bus 190 via a block storage controller 192. The block storage system 194 and the block storage controller 192 might be compliant with a protocol such as, for example, an SAS (Serial Attached SCSI/Small Computer System Interface) or an SATA (Serial ATA/Advanced Technology Attachment) protocol.

Additionally, a local block storage system 90 may be coupled directly to the IO bus 190, wherein the local block storage system 90 may be an NVM Express (NVMe) compliant system. The local block storage system 90 may communicate with one or more subsystems such as, for example, the IO bus 190, the block storage system 194 and/or a remote access storage system 92 in the peer computing system 94 via a network adapter 158.

Figure 10:
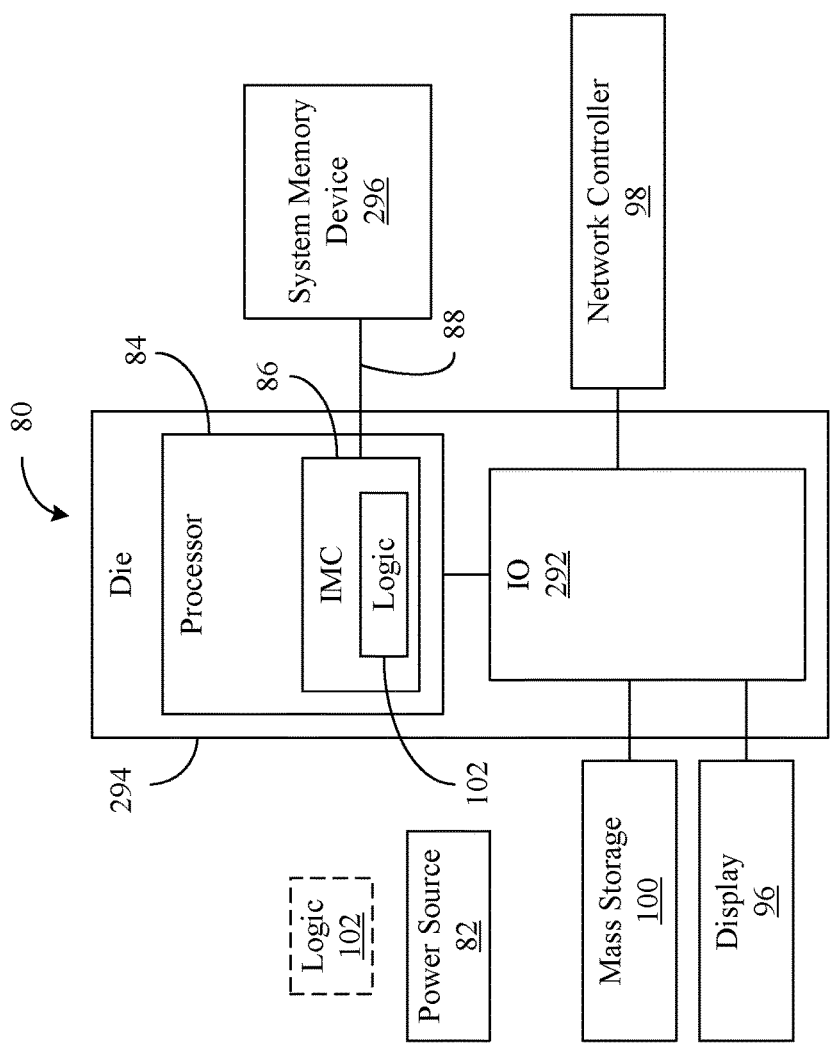
FIG. 10 is a block diagram of an example of a computing system according to an embodiment of the disclosure.

FIG. 10 shows a performance-enhanced computing system 80. The computing system 80 may generally be part of an electronic device/platform having computing functionality (e.g., personal digital assistant/PDA, notebook computer, tablet computer, server), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 80 includes a power source 82 to supply power to the system 80 and a processor 84 having an integrated memory controller (IMC) 86, which may use a bus 88 to communicate with a system memory device 296. The system memory 296 may include, for example, dynamic RAM (DRAM) configured as one or more memory modules such as, for example, dual inline memory modules (DIMMs), small outline DIMMs (SODIMMs), etc. The system memory device 296 may further be configurable to operate as volatile and/or non-volatile memory portions, and may be 3D crosspoint implemented as a DIMM.

The illustrated system 80 also includes an input output (IO) module 292 implemented together with the processor 84 on a semiconductor die 294 as a system on chip (SoC), wherein the IO module 292 functions as a host device and may communicate with, for example, a display 96 (e.g., touch screen, liquid crystal display/LCD, light emitting diode/LED display), a network controller 98, and mass storage 100 (e.g., hard disk drive/HDD, optical disk, flash memory, etc.). The IMC 86 may include logic 102 that identifies capabilities of the system memory device 296. The logic 102 may conduct a comparison of the capabilities to memory usage rules associated with the processor 84. The memory usage rules may identify allowed memory accesses by the processor 84. The processor 84 may limit access by the processor 84 to the system memory device 296 based upon the comparison. The processor 84 may implement one or more aspects of the methods 250, 300, 350, 400 and/or signaling diagram 450 (FIGS. 2-6) and may be readily substituted for the processor 202 (FIG. 1), already discussed. Likewise, the system memory device 296 may be substituted for the memory device 206, (FIG. 1). The logic 102, which may be implemented in logic instructions, configurable logic and/or fixed-functionality logic hardware, may optionally be implemented elsewhere in the system 80 such as, for example, in a module containing the system memory device 296, the IO module 292, and so forth.

A system memory device 296 as described herein may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

Additional Notes and Examples

Example 1 may include a performance-enhanced system, including a memory device including a controller and a memory, and a processor to compare an identified capability of the memory device to memory usage rules associated with the processor, wherein the memory usage rules are to identify allowed memory accesses by the processor, and limit access by the processor to the memory device based upon the comparison.

Example 1 may include a performance-enhanced system, comprising a memory device including a controller and a memory, and a processor to conduct a comparison between an identified capability of the memory device and memory usage rules associated with the processor, wherein the memory usage rules are to identify allowed memory accesses by the processor, and limit access by the processor to the memory device based upon the comparison.

Example 2 may include the system of example 1, wherein the controller is to transmit a data packet to the processor, the data packet including the identified capability.

Example 3 may include the system of example 2, wherein the processor is to issue a command to the memory device, and the controller is to transmit the data packet in response to the command.

Example 4 may include the system of example 2, wherein a basic input/output system of the system is to issue a command to the memory device, and the controller is to transmit the data packet in response to the command.

Example 5 may include the system of example 1, wherein the processor is to read content of the memory device to detect the identified capability.

Example 6 may include the system of any one of examples 1-5, wherein based upon the comparison, the processor is to limit one or more of an amount of the memory that is accessible by the processor, or a volatile memory access by the processor to the memory or a non-volatile memory access by the processor to the memory.

Example 7 may include a processor comprising a substrate, and logic coupled to the substrate and implemented at least partly in one or more of configurable logic or fixed-functionality logic hardware, the logic to conduct a comparison between an identified capability of a memory device and memory usage rules associated with the processor, wherein the memory usage rules are to identify allowed memory accesses by the processor, and limit access by the processor to the memory device based upon the comparison.

Example 8 may include the processor of example 7, wherein a data packet is to be received by the logic from the memory device, the data packet including the identified capability.

Example 9 may include the processor of example 8, wherein the logic is to issue a command to the memory device, and the data packet to be associated with the command.

Example 10 may include the processor of example 8, wherein a basic input/output system is to issue a command to the memory device, and the data packet to be associated with the command.

Example 11 may include the processor of example 7, wherein the logic is to read content of the memory device to detect the identified capability.

Example 12 may include the processor of any one of examples 7-11, wherein based upon the comparison, the logic is to limit one or more of an amount of memory of the memory device that is accessible by the processor, or a volatile memory access by the processor to the memory or a non-volatile memory access by the processor to the memory.

Example 13 may include a method of enhancing memory access, comprising conducting a comparison between an identified capability of a memory device and memory usage rules associated with a processor, wherein the memory usage rules are to identify allowed memory accesses by the processor, and limiting access by the processor to the memory device based upon the comparison.

Example 14 may include the method of example 13, further comprising transmitting a data packet from the memory device to the processor, wherein the data packet includes the identified capability.

Example 15 may include the method of example 14, further comprising issuing a command from the processor to the memory device, and wherein the transmitting the data packet is in response to the command.

Example 16 may include the method of example 14, further comprising issuing a command from a basic input/output system to the memory device, and wherein the transmitting the data packet is in response to the command.

Example 17 may include the method of example 13, further comprising reading, by the processor, content of the memory device to detect the identified capability.

Example 18 may include the method of any one of examples 13-17, wherein the limiting includes one or more of limiting an amount of memory of the memory device that is accessible by the processor, or limiting a volatile memory access by the processor to the memory or a non-volatile memory access by the processor to the memory.

Example 19 may include at least one computer readable storage medium comprising a set of instructions, which when executed, cause a computing system to compare an identified capability of a memory device to memory usage rules associated with a processor, wherein the memory usage rules are to identify allowed memory accesses by the processor, and limit access by the processor to the memory device based upon the comparison.

Example 20 may include the at least one computer readable storage medium of example 19, wherein the instructions, when executed, cause the computing system to cause the memory device to transmit a data packet to the processor, the data packet including the identified capability.

Example 21 may include the at least one computer readable storage medium of example 20, wherein the instructions, when executed, cause the computing system to cause the processor to issue a command to the memory device, wherein the memory device is to transmit the data packet in response to the command.

Example 22 may include the at least one computer readable storage medium of example 20, wherein the instructions, when executed, cause the computing system to cause a basic input/output system to issue a command to the memory device, wherein the memory device is to transmit the data packet in response to the command.

Example 23 may include the at least one computer readable storage medium of example 19, wherein the instructions, when executed, cause the computing system to cause the processor to read content of the memory device to detect the identified capability.

Example 24 may include the at least one computer readable storage medium of any one of examples 19-23, wherein the instructions, when executed, cause the computing system to, based upon the comparison, cause the processor to limit one or more of an amount of memory of the memory device that is accessible by the processor, or a volatile memory access by the processor to the memory or a non-volatile memory access by the processor to the memory.

Example 25 may include a semiconductor package apparatus, comprising means for comparing an identified capability of a memory device to memory usage rules associated with a processor, wherein the memory usage rules are to identify allowed memory accesses by the processor, and means for limiting access by the processor to the memory device based upon the means for comparing.

Example 26 may include the apparatus of example 25, further comprising means for transmitting a data packet from the memory device to the processor, wherein the data packet includes the identified capability.

Example 27 may include the apparatus of example 26, further comprising means for issuing a command from the processor to the memory device, and wherein the means for transmitting the data packet is to transmit the data packet in response to the command.

Example 28 may include the apparatus of example 26, further comprising means for issuing a command from a basic input/output system to the memory device, and wherein the means for transmitting the data packet is to transmit the data packet in response to the command.

Example 29 may include the apparatus of example 25, further comprising means for reading, by the processor, content of the memory device to detect the identified capability.

Example 30 may include the apparatus of any one of examples 25-29, wherein the means for limiting includes one or more of means for limiting an amount of memory of the memory device that is accessible by the processor, or means for limiting a volatile memory access by the processor to the memory or a non-volatile memory access by the processor to the memory.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a memory device including a controller and a memory, wherein the memory device is to support a plurality of memory modes, and wherein the plurality of memory modes is to include a first memory mode that is to correspond to a first memory region of the memory, and a second memory mode that is to correspond to a second memory region of the memory; and
a processor to:
identify a capability of the memory device based on a data packet from the memory device or a read operation to read content of the memory device;
in response to a boot-up event initiation, conduct a comparison between the identified capability of the memory device and memory usage rules associated with the processor, wherein the memory usage rules are to identify allowed memory accesses by the processor;
disallow access, associated with the first memory mode, by the processor to the memory device based upon the comparison; and
allow access, associated with the second memory mode, by the processor to the memory device based upon the comparison.

2. The system of claim 1, wherein the controller is to transmit the data packet to the processor, the data packet including the identified capability.

3. The system of claim 2, wherein:
the processor is to issue a command to the memory device; and
the controller is to transmit the data packet in response to the command.

4. The system of claim 2, wherein:
a basic input/output system of the system is to issue a command to the memory device; and
the controller is to transmit the data packet in response to the command.

5. The system of claim 1, wherein the processor is to read the content of the memory device to detect the identified capability.

6. The system of claim 1, wherein one memory region from the first memory region and the second memory region is a volatile memory region and another memory region from the first memory region and the second memory region is a non-volatile memory region.

7. The system of claim 1, wherein the memory includes a dual inline memory module that includes three-dimensional (3D) crosspoint memory.

8. A processor comprising:
a substrate; and
logic coupled to the substrate and implemented at least partly in one or more of configurable logic or fixed-functionality logic hardware, the logic coupled to the substrate to:
identify a capability of a memory device based on a data packet from the memory device or a read operation to read content of the memory device;
in response to a boot-up event initiation, conduct a comparison between the identified capability of the memory device and memory usage rules associated with the processor, wherein the memory usage rules are to identify allowed memory accesses by the processor;
disallow access, associated with a first memory mode of the memory device, by the processor to the memory device based upon the comparison, wherein the first memory mode is to correspond to a first memory region of the memory device; and
allow access, associated with a second memory mode of the memory device, by the processor to the memory device based upon the comparison, wherein the second memory mode is to correspond to a second memory region of the memory device.

9. The processor of claim 8, wherein the data packet is to be received by the logic coupled to the substrate from the memory device, the data packet including the identified capability.

10. The processor of claim 9, wherein:
the logic coupled to the substrate is to issue a command to the memory device; and
the data packet to be associated with the command.

11. The processor of claim 9, wherein:
a basic input/output system is to issue a command to the memory device; and
the data packet to be associated with the command.

12. The processor of claim 8, wherein the logic coupled to the substrate is to read the content of the memory device to detect the identified capability.

13. The processor of claim 8, wherein one memory region from the first memory region and the second memory region is a volatile memory region and another memory region from the first memory region and the second memory region is a non-volatile memory region.

14. The processor of claim 8, wherein the memory device is to include a dual inline memory module that includes three-dimensional (3D) crosspoint memory.

15. A method of memory access, comprising:
identifying, with a processor, a capability of a memory device based on a data packet from the memory device or a read operation to read content of the memory device;
in response to a boot-up event initiation, conducting a comparison between the identified capability of the memory device and memory usage rules associated with the processor, wherein the memory usage rules are to identify allowed memory accesses by the processor;
disallowing access, associated with a first memory mode of the memory device, by the processor to the memory device based upon the comparison, wherein the first memory mode corresponds to a first memory region of the memory device; and
allowing access, associated with a second memory mode of the memory device, by the processor to the memory device based upon the comparison, wherein the second memory mode corresponds to a second memory region of the memory device.

16. The method of claim 15, further comprising transmitting the data packet from the memory device to the processor, wherein the data packet includes the identified capability.

17. The method of claim 16, further comprising issuing a command from the processor to the memory device, and
wherein the transmitting the data packet is in response to the command.

18. The method of claim 16, further comprising issuing a command from a basic input/output system to the memory device, and
wherein the transmitting the data packet is in response to the command.

19. The method of claim 15, further comprising reading, by the processor, content of the memory device to detect the identified capability.

20. The method of claim 15, wherein one memory region from the first memory region and the second memory region is a volatile memory region, and another memory region from the first memory region and the second memory region is a non-volatile memory region.

21. The method of claim 15, wherein the memory device includes a dual inline memory module that includes three-dimensional (3D) crosspoint memory.

22. At least one non-transitory computer readable storage medium comprising a set of instructions, which when executed, cause a computing system to:
identify, with a processor, a capability of a memory device based on a data packet from the memory device or a read operation to read content of the memory device;
in response to a boot-up event initiation, compare the identified capability of the memory device to memory usage rules associated with the processor, wherein the memory usage rules are to identify allowed memory accesses by the processor;
disallow access, associated with a first memory mode of the memory device, by the processor to the memory device based upon the comparison, wherein the first memory mode is to correspond to a first memory region of the memory device; and
allow access, associated with a second memory mode of the memory device, by the processor to the memory device based upon the comparison, wherein the second memory mode is to correspond to a second memory region of the memory device.

23. The at least one non-transitory computer readable storage medium of claim 22, wherein the instructions, when executed, cause the computing system to cause the memory device to transmit the data packet to the processor, the data packet including the identified capability.

24. The at least one non-transitory computer readable storage medium of claim 23, wherein the instructions, when executed, cause the computing system to cause the processor to issue a command to the memory device,
wherein the memory device is to transmit the data packet in response to the command.

25. The at least one non-transitory computer readable storage medium of claim 23, wherein the instructions, when executed, cause the computing system to cause a basic input/output system to issue a command to the memory device,
wherein the memory device is to transmit the data packet in response to the command.

26. The at least one non-transitory computer readable storage medium of claim 22, wherein the instructions, when executed, cause the computing system to cause the processor to read the content of the memory device to detect the identified capability.

27. The at least one non-transitory computer readable storage medium of claim 22, wherein
one memory region from the first memory region and the second memory region is a volatile memory region and another memory region from the first memory region and the second memory region is a non-volatile memory region.

28. The at least one non-transitory computer readable storage medium of claim 22, wherein the memory device is to include a dual inline memory module that includes three-dimensional (3D) crosspoint memory.

* * * * *